Nov. 22, 1938.  W. GOSMANN  2,137,338

APPARATUS FOR PRODUCING FOAM FOR FIRE EXTINGUISHING PURPOSES

Filed Sept. 9, 1935

Patented Nov. 22, 1938

2,137,338

UNITED STATES PATENT OFFICE 2,137,338

APPARATUS FOR PRODUCING FOAM FOR FIRE EXTINGUISHING PURPOSES

Walther Gosmann, Dortmund, Germany

Application September 9, 1935, Serial No. 39,820
In Germany March 28, 1934

4 Claims. (Cl. 261—78)

This invention relates to an apparatus for producing foam for fire extinguishing purposes from several substances to be mixed for example water, air and foam producer, which are fed in different directions into a mixing chamber.

The invention differs advantageously from known apparatuses of this type primarily in that the conduits, conducting the foam producing components to the mixing chamber, project into this chamber and that their outlet ends are axially aligned in such a manner that the substances collide with great force and at a high speed at one point so that a consistent foam is produced. The arrangement is preferably such, that the jets collide on their entire width and a good intermixing of the individual particles is ensured. The outlet ends of the conduits are preferably of nozzle-shape. In the interior of the outlet ends helical windings or guide surfaces may be provided so that the jets are ejected with a twist and the foam which is formed can be led off through the discharge terminating tangentially in the mixing chamber. In order to prevent the foam being formed from acting as a cushion and impeding thus the thorough mixing and impacting of the ejected jets the discharge apertures of the pipes are brought as close together as possible so that the jets are compelled to collide with great force. Moreover, the mixing chamber is preferably widened, for example by an annular bulge, at the point where the foam forms and the discharge therefor is situated, so that the foam being formed can immediately yield towards the sides and is not in the way of the next following jets.

If the foam producer is previously dissolved in water only two feed conduits leading to the mixing chamber are necessary, one of which feeds the water-foam former mixture and the other the air. Nozzles at the outlet ends of these two conduits are situated opposite one another substantially in axial alignment, so that the ejected jets of air and mixture encounter centrally and are effectively spread out fan-shape. If, however, each of the three foam forming components is fed to the mixing chamber through a separate conduit, the conduit for the foam former and the conduit for the water may be arranged coaxially and axially aligned with the air conduit. One or more of the conduits may be provided with a throttle arrangement in order to enable the consistence of the foam to be varied by changing the pressure or the quantity.

Two embodiments of the invention are illustrated, by way of example, in the accompanying drawing in which.

Figure 1:
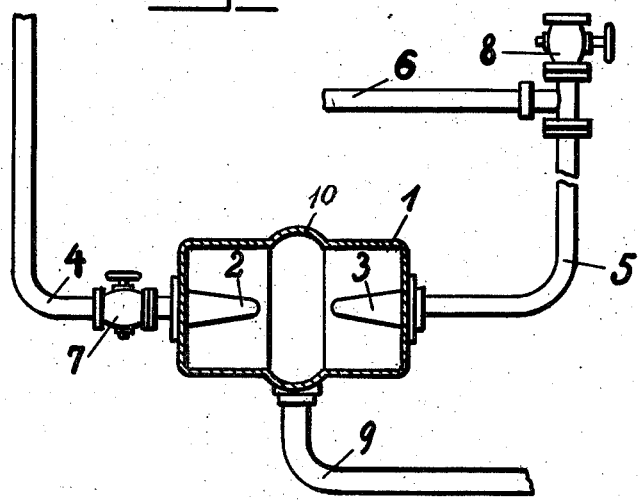
Fig. 1 shows a mixing chamber in longitudinal section with axially aligned nozzles for the mixture and for the air.

According to Fig. 1 the ends of conduits 4, 5, to which are attached axially aligned nozzles 2, 3, project into a mixing chamber 1, the outer ends of these nozzles being at a short distance apart so that the jets are projected therefrom centrally. The conduit 4 leads from a tank, not shown, containing the foam forming mixture composed of water and a foam producer, such as saponin. The conduit 5 leads from a compressed air vessel not shown and a branch 6 of this conduit leads to the same tank as the conduit 4. When the valve 8 is opened the compressed air passes firstly through the conduit 5 to the nozzle 3 in the mixing chamber 1 and secondly through the conduit 6 onto the surface of the liquid in the tank, not shown. Owing to the pressure bearing on the liquid surface the liquid will flow to the nozzle 2 in the mixing chamber 1 at the same pressure as the compressed air flowing to the nozzle 3. Between the tank and the mixing chamber and the mixing chamber and the compressed air vessel valves 7, 8 are arranged which allow the regulation of the quantities of media flowing to the mixing chamber. The mixing chamber 1 is preferably, though not necessarily, widened at 10 in the region of the fan-shaped veil produced by the impact of the jets from nozzles 2 and 3, and a discharge pipe 9 is connected to the chamber at this widened portion, if provided. The foam being formed is thus enabled to immediately escape laterally and does not hinder the subsequent flow of the jets ejected from the nozzles 2, 3. The consistency of the foam can be regulated in a simple manner by adjusting the compressed air valve 8. If the supply of compressed air is reduced less foam will be formed, whereas if the supply is increased a stiffer and more consistent foam will result.

Figure 2:
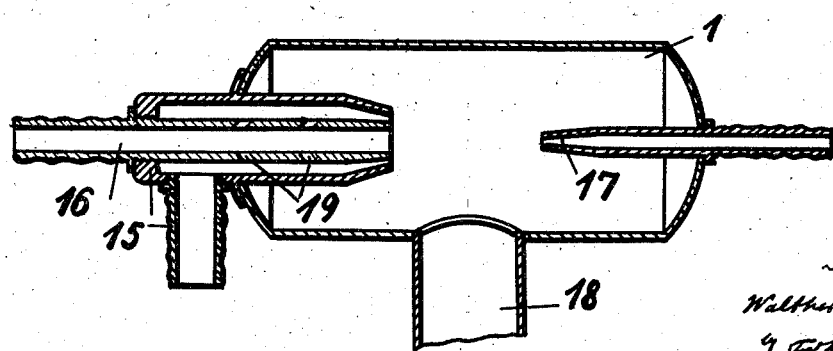
Fig. 2 shows in longitudinal section a mixing chamber with coaxially arranged nozzles for the water and the foam producer at one end of the mixing chamber, and an air nozzle at the other.

According to the construction shown in Fig. 2 three conduits separately feeding the media terminate in the mixing chamber 1, the arrangement being such that the conduits conducting the foam producer, for example the saponin and the water, are united to form an aggregate in such a manner that one conduit coaxially surrounds the other. The water is fed through the conduit 15 which surrounds the saponin conduit 16. The outlet end of the air conduit 17 is opposite the conduits 15, 16 and axially aligned therewith. The foam formed escapes through the discharge 18. In the region where the foam formation and the discharge of the foam takes place the mixing chamber 1 can be provided with the widening as described. Moreover, the saponin conduit 16 may have apertures 19, so that before entering the mixing chamber a portion of the saponin passes into the water feed conduit 15 surrounding the saponin conduit 16 and a partial pre-mixing takes place. For regulating the foam or the quantities of the foam producing components fed into the mixing chamber, the necessary devices, such as valves, may be provided in the conduits.

I claim:

1. An apparatus for producing foam for fire extinguishing purposes comprising in combination a mixing chamber, at least one discharge pipe leading from said mixing chamber transversely to the vessel, conduits extending into said chamber in axial alignment, one of said conduits conducting foam producer and the opposite conduit conducting gas, the outlet ends of said conduits being situated between the ends and the centre of said chamber so that the jets projected from said conduits impact substantially at the centre of said chamber.

2. Apparatus as specified in claim 1, in which the conduit conducting the foam producer is composed of an inner pipe conducting foam producer and an outer pipe conducting water.

3. Apparatus as specified in claim 1, in which the conduit composed of an inner pipe conducting foam producer and of an outer pipe conducting water, the inner pipe having at least one aperture communicating with the outer pipe.

4. Apparatus as specified in claim 1, in which the mixing chamber has an annular widened portion surrounding the point of impact of the jets projected from the conduits, and a foam discharge pipe extends from this widened portion.

WALTHER GOSMANN.